United States Patent
Hotta et al.

(10) Patent No.: US 6,369,963 B1
(45) Date of Patent: Apr. 9, 2002

(54) OPTICAL PICKUP APPARATUS

(75) Inventors: Tohru Hotta; Ikuo Kasuga; Katsushige Yanagisawa, all of Simosuwa-machi (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 09/611,273

(22) Filed: Jul. 6, 2000

(30) Foreign Application Priority Data

Jul. 7, 1999 (JP) .......................................... 11-192540

(51) Int. Cl.$^7$ .............................. G02B 7/02; G11B 7/00
(52) U.S. Cl. ..................... 359/824; 359/813; 369/44.14
(58) Field of Search ................................. 359/824, 823, 359/822, 814, 813; 369/44.14, 823

(56) References Cited

U.S. PATENT DOCUMENTS

| | | | | |
|---|---|---|---|---|
| 5,812,329 A | * | 9/1998 | Togashi ....................... | 359/822 |
| 6,097,690 A | * | 8/2000 | Mochizuki et al. ......... | 369/112 |
| 6,137,765 A | * | 10/2000 | Saito et al. ................. | 369/219 |
| 6,172,958 B1 | * | 1/2001 | Mochizuki et al. ......... | 369/112 |

* cited by examiner

*Primary Examiner*—Georgia Epps
*Assistant Examiner*—Saeed Seyrafi
(74) *Attorney, Agent, or Firm*—Hogan & Hartson, LLP (57) ABSTRACT

An optical pickup apparatus has an objective lens, a lens holder that mounts the objective lens, a main frame holding the lens holder, and first and second inclination angle adjusting mechanism for adjusting angles of inclination of the objective lens. A main shaft guide frame is mounted on one side of the main frame. A main shaft mounted on the main shaft guide frame for guiding the objective lens in a radial direction of an optical disc. An auxiliary shaft guide frame is mounted on another side of the main frame. An auxiliary shaft is mounted on the auxiliary shaft guide groove to allow the objective lens to slidably move in parallel with the main shaft. The first inclination angle adjusting mechanism has a first bearing shaft for rotatably supporting the main shaft guide frame about a first axis with respect to the main frame. The main shaft defines a second axis extending generally in parallel with the main shaft and perpendicular to the first axis. The second inclination angle adjusting mechanism has a second bearing shaft for rotatably supporting an auxiliary shaft guide frame with respect to the main frame about a third axis that is located between the main shaft and the auxiliary shaft and extends in parallel with the second axis.

17 Claims, 5 Drawing Sheets

OPTICAL PICKUP APPARATUS

BACKGROUND OF THE INVENTION

1. Field of the Invention

The present invention relates to an optical pickup apparatus and, more particularly, to improvements in an inclination angle adjusting mechanism for adjusting inclination angle of an objective lens in an optical pickup apparatus.

2. Description of Related Art

An optical pickup apparatus is typically mounted in an optical disc player apparatus for optical discs such as CD, DVD, and the like. In order to place an optical axis of an objective lens in a direction perpendicular to a recorded surface of the optical disc, the inclination angle of the objective lens may be adjusted. A conventional inclination angle adjusting mechanism for adjusting the inclination angle of the objective lens is described, for example, in Japanese Laid-open patent application HEI 6-195722.

The inclination angle adjusting mechanism described in the Japanese Laid-open patent application HEI 6-195722 has an objective lens mounted on an optical head section. A carriage supports one side of the optical head. A first guide shaft passes the carriage in a sliding manner. The other side of the optical head is supported by a radial-ball bearing that is rotatably mounted on a second guide shaft. The carriage is rotatably mounted with respect to the optical head section about a first axis extending in a tangential direction of an optical disc. A screwed amount of an inclination angle adjusting screw is changed to thereby change an inclination of the optical head about the first axis.

Also, the publication describes an eccentric pin that is rotated to adjust the height of the radial ball bearing that is placed on the second guide shaft. As the height is changed, the inclination amount of the optical head about the first guide shaft can be changed. In other words, the inclination amount of the optical head can be adjusted about the second axis that extends in a radial direction of the optical disc.

The inclination angle adjusting mechanism described above has a first inclination angle adjusting mechanism that adjusts the inclination of the optical head about the first axis, and a second inclination angle adjusting mechanism that adjusts the inclination of the optical head about the second axis that extends in the radial direction of an optical disc. The first inclination angle adjusting mechanism and the second inclination angle adjusting mechanism have different adjustment structures. For example, one of them is provided with the eccentric pin, but the other does not have an eccentric pin. As a result, there are problems in that the number of component parts increases and the structure thereof is relatively complicated.

Also, since the inclination angle adjusting mechanism described above does not have or is difficult to provide a reference point to be used for adjusting the inclination angle of the objective lens, the inclination angle cannot be re-adjusted with good reproducibility. More specifically, the inclination angle of an optical head section may be adjusted before it is shipped out from the factory. However, when the performance of the optical head section has deteriorated for one reason or another, the same condition of the optical head adjusted at the factory cannot be reproduced. Accordingly, it is very difficult to determine or repair such a defect.

For example, in the inclination angle adjusting mechanism of the conventional art described above, reference positions for adjusting the inclination angle are not determined, and thus the apparatus cannot be placed in the reference positions. In other words, the optical head section that has a variety of components mounted thereon is not provided with any reference angle that may be used for mounting the carriage and the eccentric pin that form the inclination angle adjusting mechanism. Therefore, initial inclination angles about various axes of the optical head section that are adjusted when the carriage and the eccentric pin are mounted on the optical head section cannot be reproduced later.

SUMMARY OF THE INVENTION

It is an object of the present invention to provide an optical pickup apparatus that solve the problems of the conventional art described above. It is also an object of the present invention to reduce the number of component parts in an optical pickup apparatus and to simplify its structure. Also, it is an object of the present invention to provide an optical pickup apparatus having an inclination angle adjusting mechanism that can readily reproduce the inclination angle.

In order to achieve the above-described objects, in accordance with one embodiment of the present invention, an inclination angle adjusting mechanism has a first inclination angle adjusting mechanism and a second inclination angle adjusting mechanism. The first inclination angle adjusting mechanism is adapted for tilting the objective lens about a first axis that passes through a center of an auxiliary shaft guide groove and extends in a tangential direction of an optical disc. The second inclination angle adjusting mechanism is adapted for tilting the objective lens about a second axis that concurs with a central axis of the main shaft.

The first inclination angle adjusting mechanism has a first bearing shaft for rotatably supporting the main shaft guide frame about the first axis with respect to the main frame, and a first inclination angle adjusting screw that is capable of fixing the main shaft guide frame about the first bearing shaft at a predetermined inclined position.

The second inclination angle adjusting mechanism has a second bearing shaft for rotatably supporting the auxiliary shaft guide frame with respect to the main frame about a third axis that is located between the main shaft and the auxiliary shaft and extends in parallel with the second axis, and a second inclination angle adjusting screw that is capable of fixing the auxiliary shaft guide frame about the second bearing shaft at a predetermined inclined position.

The inclination angle adjusting screws are turned to adjust the inclination angles. Preferably, the inclination angle adjusting screws may not have any plays to accurately perform the adjustment of the inclination angles. For this to be achieved, spring-washers may preferably be disposed between heads of the inclination angle adjusting screws and the guide frames, and the heads of the inclination angle adjusting screws are normally pushed by leaf springs toward the spring washers.

Also, the component parts of the first inclination angle adjusting mechanism and the second inclination angle adjusting mechanism may be formed from common parts except those components for the main shaft guide frame and the auxiliary shaft guide frame. As a result, the number of types of component parts is reduced, the cost is reduced and the component parts can be readily assembled.

Furthermore, in a preferred embodiment, the auxiliary shaft guide frame may have a pair of groove side surfaces that form the auxiliary shaft guide groove. The groove side surfaces may preferably have at least a section with a convex curved surface that protrudes from the groove side surface as viewed in the direction of the first axis. As a result, at least one of the groove side surfaces of the auxiliary shaft guide frame does not touch the auxiliary shaft when the inclination angle adjustment is performed about the first axis.

Moreover, in the second inclination angle adjusting mechanism, a distance between the center of the auxiliary shaft guide groove and the center of the second bearing shaft may preferably be set at a half or less than a distance between the center of the auxiliary shaft guide groove and the center of the main shaft. As a result, the amount of changes in the inclination angle of the auxiliary shaft guide frame, which is obtained by turning the second inclination angle adjusting screw, is smaller than the resultant amount of changes in the inclination angle of the main frame that mounts the objective lens. Accordingly, the resolution in the adjustment of the inclination angle can be increased as the difference in the distances is increased.

In accordance with another embodiment of the present invention, a method is provided for setting an objective lens of an optical pickup apparatus having the structure described above at a reference inclination angle position. The method is characterized in that first and second spacers each having predetermined thickness are interposed between the main frame and the respective main shaft guide frame and auxiliary shaft guide frame, and setting the main shaft guide frame and the auxiliary shaft guide frame at the reference inclination angle position with respect to the main frame.

By the optical pickup apparatus of the present invention in which the spacers are interposed in the manner described above, initial inclination angles about axes of the main frame, that are set when the main shaft guide frame and the auxiliary shaft guide frame are initially mounted on the main frame, can always be reproduced. As a result, if the performance of the head section deteriorates for one reason or another after the inclination angle of the head section is adjusted, the spacers are inserted, such that the performance of the head section can be evaluated in the same condition as that attained at factory before shipping of the optical pickup apparatus. Consequently, the determination and repair of defects can be readily performed.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIGS. 2(a)–(e) show a main frame and a main shaft guide frame shown in FIG. 1. More particularly.

FIGS. 3(a)–(c) show the main frame and an auxiliary shaft guide frame shown in FIG. 1. More particularly.

FIGS. 4(a)–(c) show the main frame and the auxiliary shaft guide frame shown in FIG. 1 in an assembled state. More particularly.

DETAILED DESCRIPTION OF PREFERRED EMBODIMENTS

An optical pickup apparatus in which the present invention applied will be described with reference to the accompanying drawings. The general structure is described first.

Figure 1A:
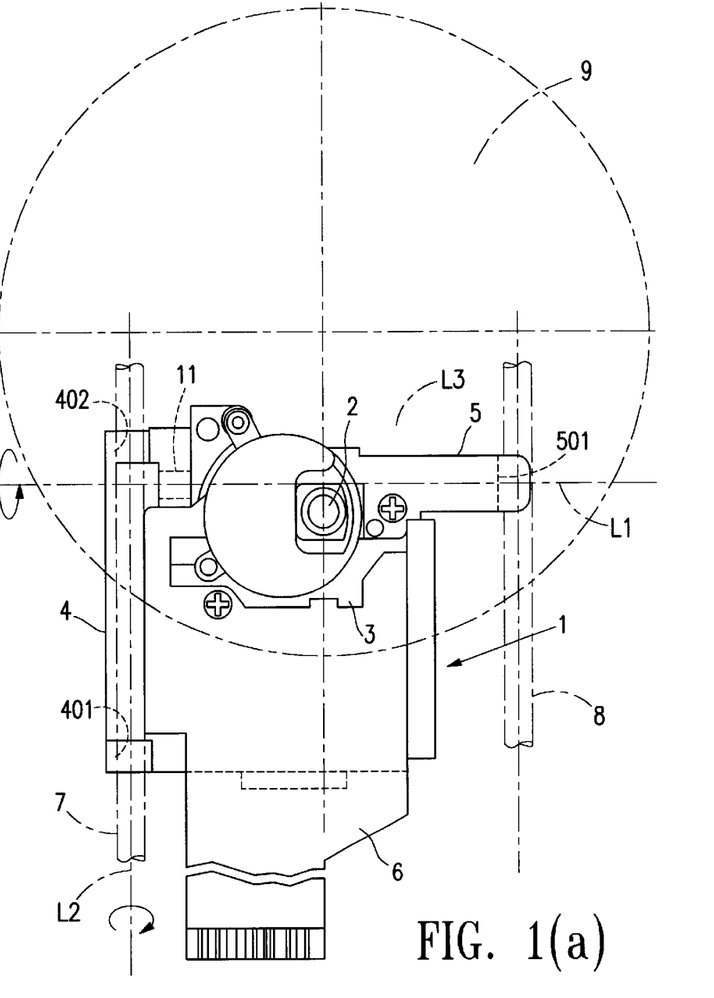
FIGS. 1(a)–(c) are a plan view, a front view and a side view of an optical pickup apparatus in accordance with one embodiment of the present invention.
Figure 1B:
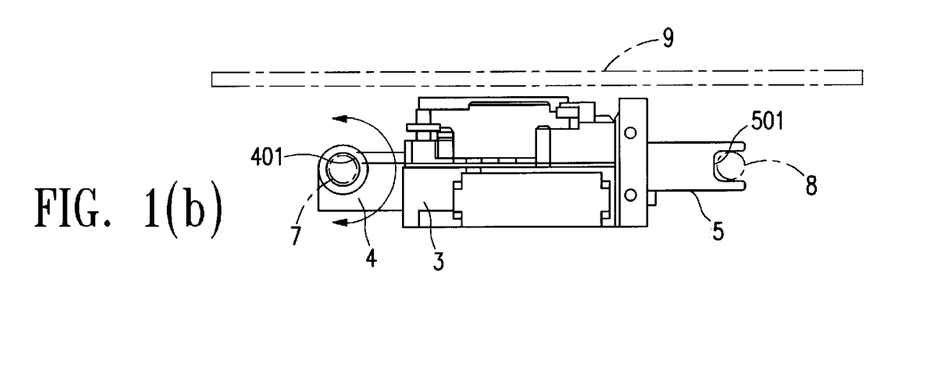
Figure 1C:
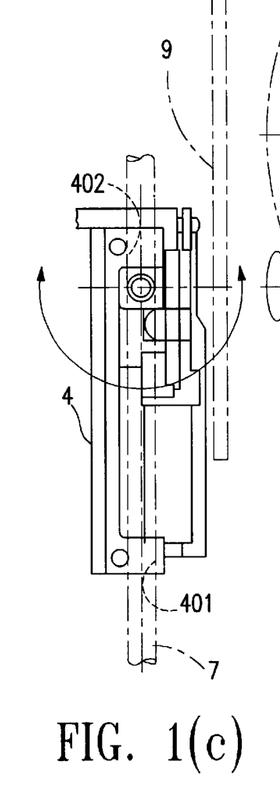

FIGS. 1(a)–1(c) are a plan view, a front view and a side view of an overall structure of an optical pickup apparatus, respectively. As shown in these figures, an optical pickup apparatus 1 has an objective lens 2, and a main frame 3 that retains a lens holder mounting the objective lens 2 and other optical components (not shown) that are required for an optical pickup apparatus. The optical pickup apparatus 1 also has a main shaft guide frame 4 that is attached to one side of the main frame 3 and an auxiliary shaft guide frame 5 that is attached to the other side of the main frame 3. A flexible circuit substrate 6 extends out from the main frame 3. The lens holder and the other optical components that are mounted on the main frame 3 may be formed from known components. Therefore, the detailed description thereof is omitted.

The optical pickup apparatus 1 having the structure described above spans across a main shaft 7 and an auxiliary shaft 8 that extend in parallel with each other and disposed on a main frame of a player apparatus for optical discs such as CDs and DVDs. The optical pickup apparatus 1 can reciprocally move along the main shaft 7 and the auxiliary shaft 8 in a radial direction of an optical disc 9. In one embodiment, the main shaft guide frame 4 has a pair of main shaft guide apertures 401 and 402 through which the main shaft 7 passes, such that the optical pickup apparatus 1 can be slidably moved along the main shaft 7. Also, the auxiliary shaft guide frame 5 has an auxiliary shaft guide groove 501 through which the auxiliary shaft 8 passes to allow the sliding movement along the auxiliary shaft 8.

The optical pickup apparatus 1 of the present embodiment has a first inclination angle adjusting mechanism and a second inclination angle adjusting mechanism. The first inclination angle adjusting mechanism can adjust the inclination angle of the objective lens 2 about a first axis L1 that extends in a direction perpendicular to the sliding movement direction in the radial direction of the optical disc 9. The second inclination angle adjusting mechanism can adjust the inclination angle of the objective lens 2 about a second axis L2 that extends in a direction in parallel with the sliding movement direction in the radial direction of the optical disc 9. In the present embodiment, the second axis L2 concurs with the central axis of the main shaft 7. The first inclination angle adjusting mechanisms is described in detail below.

Figure 2A:
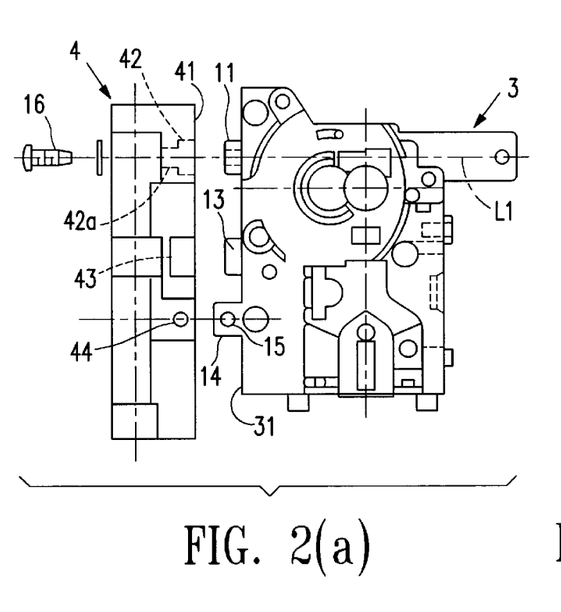
FIG. 2(a) is a plan view of the frames separated from each other.
Figure 2B:
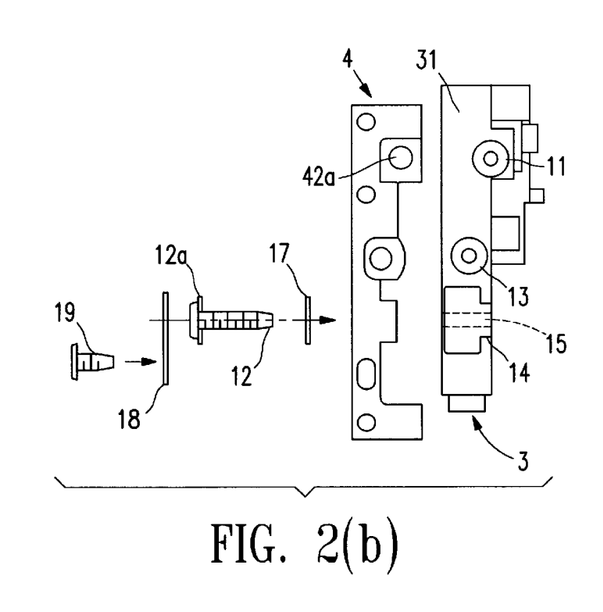
FIG. 2(b) is a side view of the frames separated from each other.
Figure 2C:
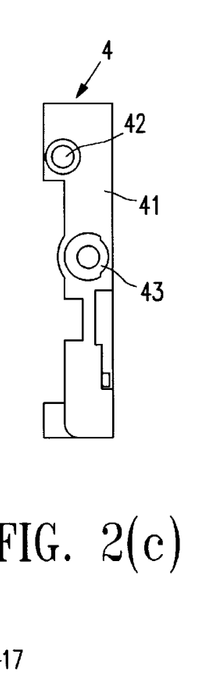
FIG. 2(c) is a side view of the main shaft guide frame.
Figure 2D:
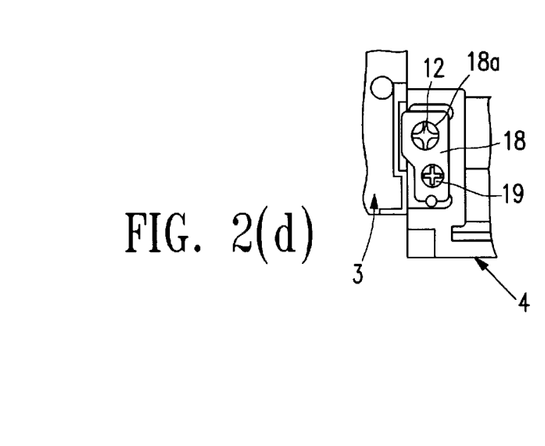
FIGS. 2(d) and (e) are respectively a partial bottom view and a partial cross-sectional view of an area where a first inclination angle adjusting screw is mounted in a state in which the main shaft guide frame is mounted on the main frame.
Figure 2E:
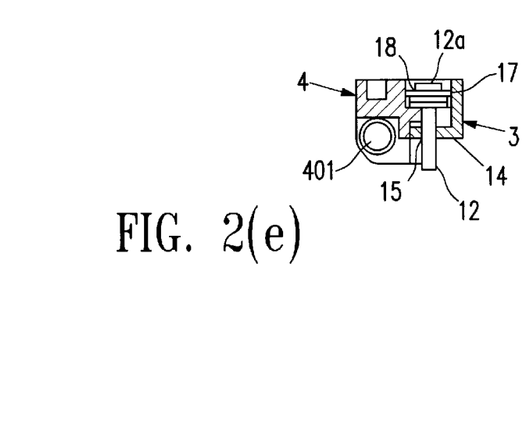

FIGS. 2(a)–2(e) are illustrations of the main frame 3 and the main shaft guide frame 4. The first inclination angle adjusting mechanism will be described with reference to these figures. FIG. 2(a) is a plan view of the frames separated from each other. FIG. 2(b) is a side view of the frames separated from each other, viewed from one side. FIG. 2(c) is a side view of the main shaft guide frame viewed from the other side. FIGS. 2(d) and 2(e) are respectively a bottom view and a partial cross-sectional view of a mounting section of the first inclination angle adjusting screw in a state in which the main shaft guide frame 4 and the main frame 3 are assembled together.

Referring to FIG. 2, the first inclination angle adjusting mechanism has a first bearing shaft 11 that rotatably supports the main shaft guide frame 4 about the first axis L1 with respect to the main frame 3, and a first inclination angle adjusting screw 12 that can fix the main shaft guide frame 4 at a specified angle about the first bearing shaft L1.

More specifically, a cylindrical protrusion 11 is formed on a side surface 31 of the main frame 3 on the side of the main shaft. The cylindrical protrusion 11 has a central axis that concurs with the first axis L1. A cylindrical stopper 13 is formed at a location away from the cylindrical protrusion 11 for limiting the maximum inclination angle of the main shaft guide frame 4. Furthermore, a plate-shaped protrusion 14 protruding from the side surface is formed at a location away from the cylindrical stopper 13 and farther away from the cylindrical protrusion 11 than from the cylindrical stopper 13. The plate-shaped protrusion 14 defines a screw hole 15 for the first inclination angle adjusting screw 12.

The side surface 31 of the main frame comes in contact with a side surface 41 of the main shaft guide frame 4. An insertion aperture 42 is formed in the side surface 41 at a location corresponding to the cylindrical protrusion 11 that serves as the first main axis. The protrusion 11 is received in the insertion aperture 42 that is rotatable with respect to the protrusion 11. A screw through hole 42a is formed in the bottom of the aperture 42. A fixing screw 16 can be screwed through the hole 42a to affix the main shaft guide frame 4 to the main frame 3.

A circular concave section 43 is formed in the side surface 41 of the main shaft guide frame at a location corresponding to the cylindrical stopper 13. The circular concave section 43 has an internal diameter that is greater than that of the stopper 13. The size of the circular concave section 43 is set such that the main shaft guide frame 4 can be tilted for the inclination angle adjustment about the first axis L1. The cylindrical stopper 13 comes in contact with the circular concave section 43 when the angle is adjusted excessively, such that the inclination angle of the main shaft guide frame 4 is limited.

Also, a through screw hole 44 is formed in the main shaft guide frame 4 at a location corresponding to the screw hole 15 of the main frame 3. The first inclination angle adjusting screw 12 is passed through the through screw hole 44 from the back side of the main shaft guide frame 4 and fixes a first inclination angle after the first inclination angle is adjusted by using the screw hole 15 of the main frame 3.

In this embodiment, a spring washer 17 and a leaf spring 18 are used to eliminate plays of the first inclination angle adjusting screw 12. More specifically, the screw 12 is passed through the spring washer 17 and the through screw hole 44. Then, a head section 12a of the screw 12 is pressed by the leaf spring 18. The leaf spring 18 defines an exposure hole 18a that exposes an upper half of the screw head section 12a. The leaf spring 18 is affixed to the main shaft guide frame 4 by a fixing screw 19.

By the first inclination angle adjusting mechanism thus composed, the first inclination angle adjusting screw 12 is rotated to increase or decrease its screwed amount. As a result, the inclination angle of the main shaft guide frame 4 is adjusted with respect to the main frame 3 about the first axis L1 that passes the center of the cylindrical protrusion 11 that serves as the first bearing shaft. Since the main shaft guide frame 4 is supported by the main shaft 7, the inclination angle of the objective lens 3 that is mounted on the main frame 3 can be adjusted about the first axis L1.

A second inclination angle adjusting mechanism is described next.

Figures 3A, 3B, 3C:
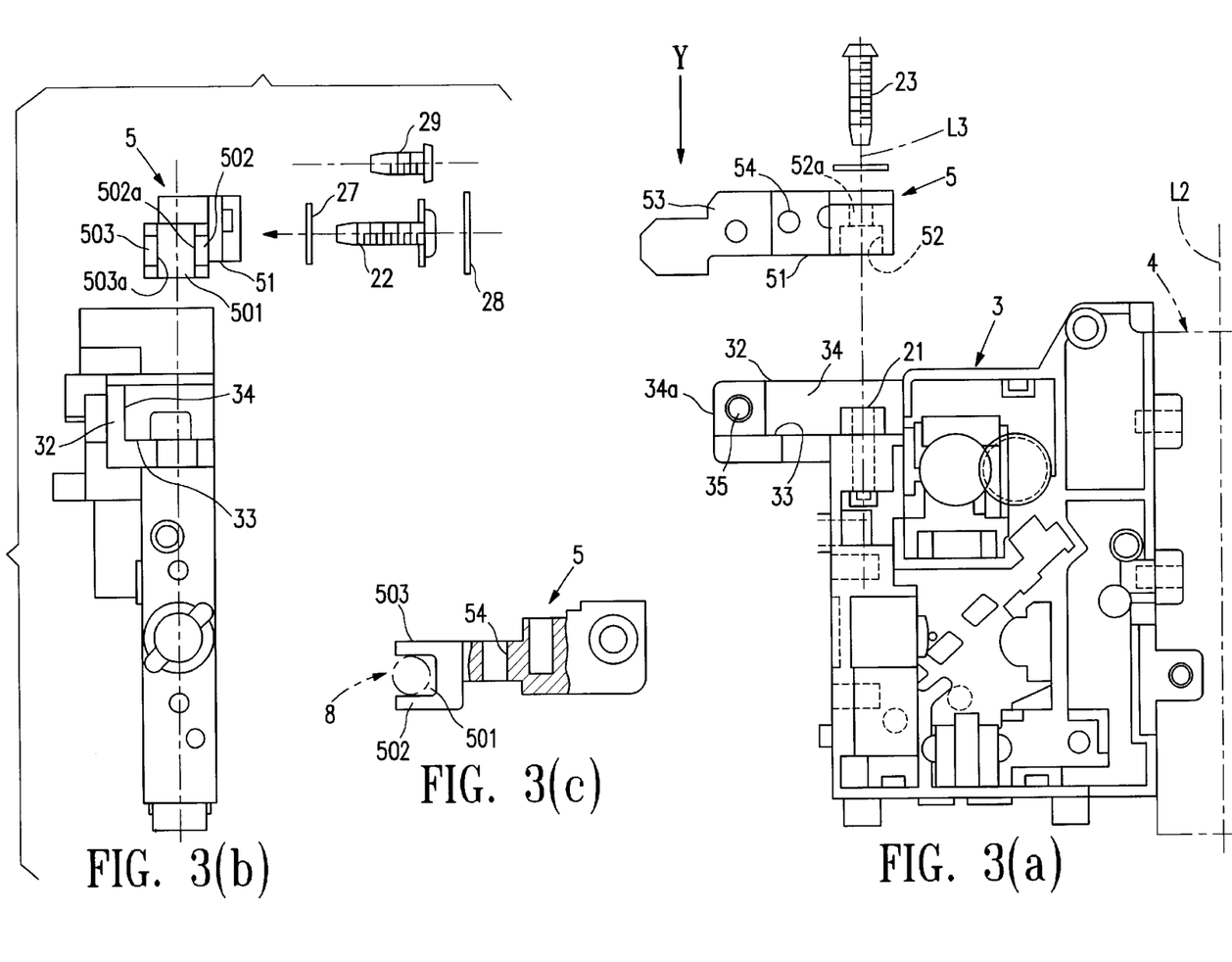
FIG. 3(a) is a bottom view of the main frame and an auxiliary shaft guide frame.
FIG. 3(b) is a side view of these frames.
FIG. 3(c) is an end side view of the auxiliary shaft guide frame.
Figure 4A:
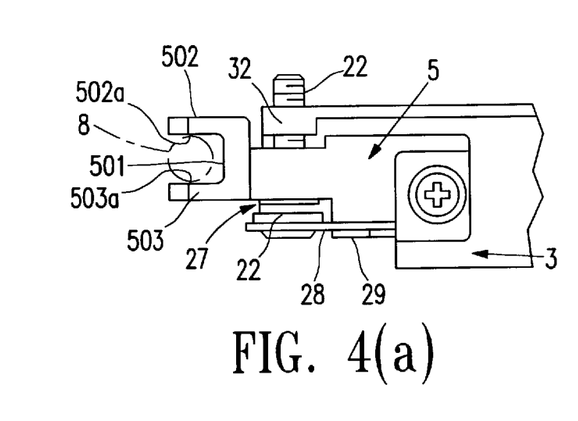
FIG. 4(a) is a perspective view of one area of FIG. 3 viewed in a direction of an arrow Y.
Figure 4B:
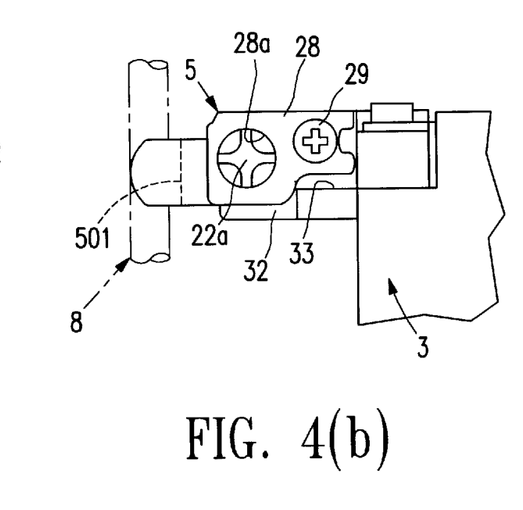
FIG. 4(b) is a partial plan view of the area.
Figure 4C:
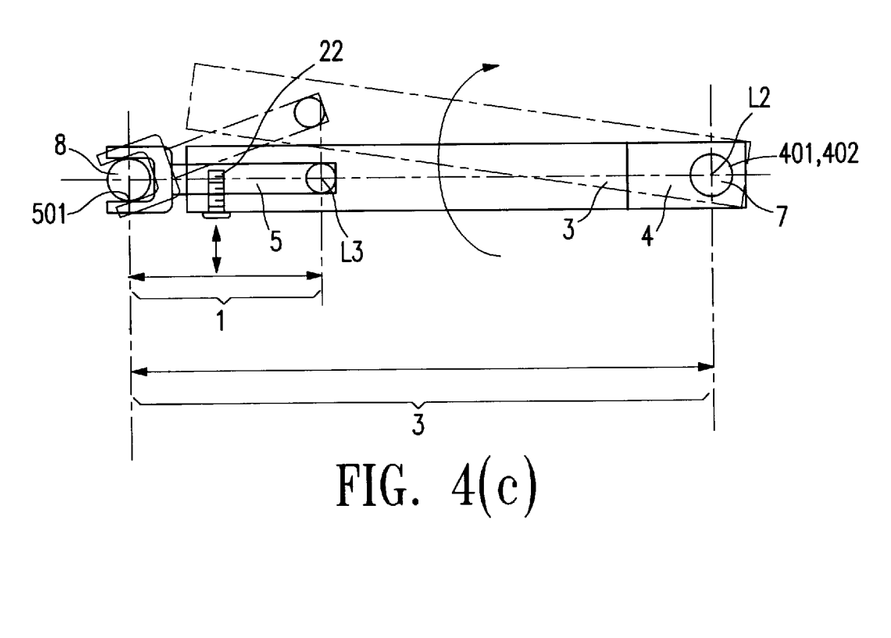
FIG. 4(c) is a view to explain an inclination angle adjustment operation by the second inclination angle adjusting mechanism.

FIGS. 3 and 4 are illustrations of the main frame 3 and the auxiliary shaft guide frame 5. The second inclination angle adjusting mechanism will be described below with reference to these figures. FIG. 3(a) is a bottom view of the frames. FIG. 3(b) is a side view of the frames. FIG. 3(c) is a side view of the frames. FIGS. 4(a)–(c) show a state in which the main frame 3 and the auxiliary shaft guide frame 5 are assembled together. FIG. 4(a) is a partial view of the assembly shown in FIG. 3(a) as viewed in the direction of the arrow Y. FIG. 4(b) is a partial plan view of the assembly shown in FIG. 3(a). FIG. 4(c) is a view to be used to explain the operation of adjusting the inclination angle performed by the second inclination angle adjusting mechanism.

Referring to the figures, the second inclination angle adjusting mechanism has a second bearing shaft 21 that rotatably supports the auxiliary shaft guide frame 5 with respect to the main frame 3 about a third axis L3 that is located between the main shaft 7 and the auxiliary shaft 8, and a second inclination angle adjusting screw 22 that can fix the auxiliary shaft guide frame 5 at a specified angle about the second bearing shaft 21.

The main frame 3 has an arm section 32 that extends in a direction perpendicular to the second axis L2 (in the same direction of the axis of the main shaft 7). The arm section 32 has an end face 33 that is perpendicular to the second axis L2, and a step surface 34 that extends in parallel with the second axis L2 and perpendicular to the end face 33. The end face 33 has a cylindrical protrusion 21 that is formed to serve as a second bearing shaft. A rectangular protruded face 34a is formed in one end section of the step surface 34. The protruded face 34a slightly protrudes toward the surface of the main frame. A screw hole 35 is formed in the center of the protruded face 34a.

The auxiliary shaft guide frame 5 has a side surface 51 that comes in contact with the end face 33 of the main frame. An insertion hole 52 is formed in the side surface 51 at a location opposing to the cylindrical protrusion 21 that serves as the second bearing shaft. The auxiliary shaft guide frame 5 having the insertion hole 52 is rotatable about the cylindrical protrusion 21.

A screw through hole 52a is formed in the bottom of the insertion hole 52. A fastening screw 23 that is passed through the hole 52a is screwed in a screw hole formed in the cylindrical protrusion 21 at its center, to thereby affix the auxiliary shaft guide frame 5 to the main frame 3.

A screw insertion hole 54 extending in a vertical direction is formed in a rear surface 53 of the auxiliary shaft guide frame 5 at a location opposing to the screw hole 35. The second inclination angle adjusting screw 22 is passed through the insertion screw hole 54 from the backside of the auxiliary shaft guide frame and screwed in the screw hole 35 of the main frame. After the adjustment by the second inclination angle adjusting screw 22, the inclination angle is fixed. The second inclination angle adjusting screw 22 is rotated to increase or decrease its screw amount to change the inclination of the auxiliary shaft guide frame 5 about the cylindrical protrusion 21 that serves as the second bearing shaft, i.e., about the third axis L3. As a result, the inclination of the main frame 3 can be adjusted.

As shown in FIG. 4(c), the auxiliary shaft guide groove 501 is formed with the auxiliary shaft guide frame 5 at an end face thereof, as described above. The auxiliary shaft guide groove 501 is rotatable and slidable with respect to the auxiliary shaft 8. Also, the main shaft guide frame 4 is attached to the opposite side of the main frame 3. The main shaft 7 is also attached in a manner rotatable and slidable with respect to the main shaft guide frame 4. In this manner, both sides of the main frame are provided with the main shaft 7 and the auxiliary shaft 7. As a result, when the auxiliary shaft guide frame 5 is tilted, the main frame 3 is also tilted about the main shaft 7 upwardly or downwardly. In other words, the inclination angle of the main frame 3 can be adjusted about the second axis L2 as a center of inclination. Accordingly, the inclination angle of the objective lens 2 that is mounted on the main frame 3 can be adjusted with the second axis being the center of inclination. By increasing or decreasing the screwed amount of the second inclination angle adjusting screw 22, the inclination angle of the objective lens can be adjusted about the second axis L2 as a center of inclination.

In the second inclination angle adjusting mechanism of the second embodiment of the present invention, as shown in FIG. 4(c), a rotation center (the second bearing axis 21) of the auxiliary shaft guide frame 5 with respect to the main frame 3 is disposed between the main shaft 7 and the auxiliary shaft 8. Also, a ratio of the distance between the auxiliary shaft 8 and the bearing shaft 21 and the distance between the auxiliary shaft 8 and the main shaft 7 is set at about 1:3. Moreover, the second inclination angle adjusting screw 22 is disposed between the auxiliary shaft 8 and the second bearing shaft 21. When they are disposed in the manner described above, the inclination angle adjusting amount at the side of the main frame 3 is relatively small compared to the amount of changes in the inclination of the auxiliary shaft guide frame 5 caused by the inclination angle adjusting screw 22. In this respect, in addition to setting the distance ratio of the distance between the auxiliary shaft 8 and the second bearing shaft 21 and the distance between the auxiliary shaft 8 and the main shaft 7 at about 1:3, a difference between the two distances may also be made greater. As a result, the resolution in an adjusted amount of the inclination angle with respect to a screwed amount given by the inclination angle adjusting screw 22 can be increased.

Next, a spring washer 27 and a leaf spring 28 are employed to eliminate plays of the second inclination angle adjusting screw 22 in a similar manner as the first inclination angle adjusting screw 12. More specifically, the screw 22 is passed through the spring washer 27 and a screw insertion hole 54 provided in the auxiliary shaft guide frame 5. Then, the leaf spring 28 is used to press a head section 22a of the screw 22. The leaf spring 28 defines an exposure hole 28a that exposes an upper half of the screw head section 22a. The leaf spring 28 is affixed by a fixing screw 29 to the auxiliary shaft guide frame 5.

Also, in the first and second inclination angle adjusting mechanisms in accordance with the embodiment of the present invention, the component parts for these inclination angle adjusting mechanisms are formed from as many common parts as possible, except the main shaft guide frame 4 and the auxiliary shaft guide frame 5. More specifically, the first and second inclination angle adjusting screws 12 and 22, the fixing screws 16 and 23, the spring washers 17 and 27, the leaf springs 18 and 28, and the fixing screws 19 and 29 are formed respectively from common parts. Accordingly, the number of types of the component parts can be reduced and therefore the cost can be reduced. Also, the assembly work is simplified because the need for selection of the component parts is reduced.

On the other hand, the guide groove 501 of the auxiliary shaft guide frame 5 of the present embodiment is formed in the following manner. As shown in FIG. 3(b), the auxiliary shaft guide groove 501 has a pair of groove sidewall sections 502 and 503 in which the auxiliary shaft 8 is disposed. Convex circular faces 502a and 503a are formed on the respective groove sidewall sections 502 and 503 in a direction along the auxiliary shaft guide 8.

As described above, the first inclination angle adjusting mechanism adjust the inclination angle of the main frame 3 about the first axis L1 as a center. During the inclination angle of the main frame 3 is adjusted about the first axis L1, the auxiliary shaft guide frame 5 also rotates about the first axis L1, and thus the upper and lower groove sidewall sections 502 and 503 of the auxiliary shaft guide groove 501 also rotate with the auxiliary shaft 8 being interposed between the groove sidewall sections 502 and 503. If the groove sidewall sections 502 and 503 are respectively formed with plane surfaces, the groove sidewall sections 502 and 503 would interfere with the auxiliary shaft 8 during the rotational movement. However, this problem can be avoided by the present embodiment, because the convex circular faces 502a and 503a are formed on the respective groove sidewall sections 502 and 503, and the auxiliary shaft 8 is interposed between the convex circular faces 502a and 503a.

Next, description will be made with respect to a method of setting inclination reference angles about axes L1 and L2 of the optical pickup apparatus 1 for the first and second inclination angle adjusting mechanisms described above, which may be performed before shipping.

Figure 5A:
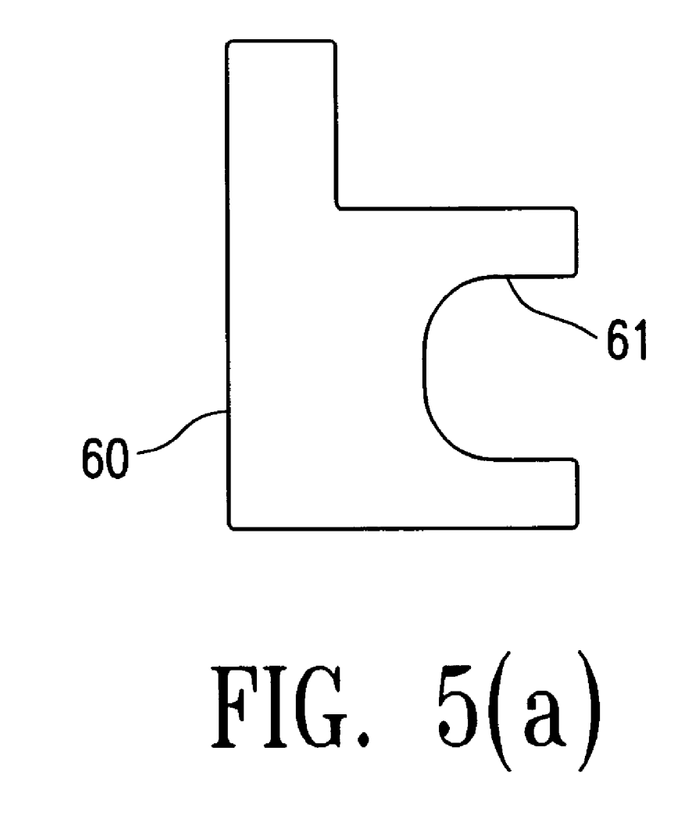
FIGS. 5(a) and (b) are respectively a plan view and a side view of an example of a spacer that is used when the optical pickup apparatus shown in FIG. 1 is assembled.
Figure 5B:
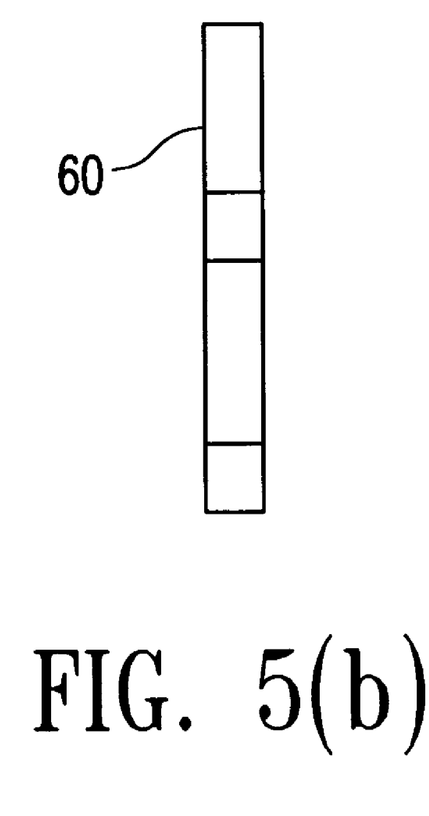

In the present embodiment, for the first inclination angle adjusting mechanism, a spacer 60 having a predetermined thickness is inserted between the plate-shaped protrusion 14 formed in the main frame 3 and defining the screw hole 15 for the first inclination angle adjusting screw 12 and a surface section on the main shaft guide frame 4 opposing to the plate-shaped protrusion 14 where the screw bushing hole 44 is formed. In this state, the first inclination angle adjusting screw 12 is fastened. The spacer 60 may be formed from a plate having the shape shown in FIG. 5, for example, in which a screw-avoiding concave section 61 is formed. By inserting the spacer 60, the inclination angle of the main shaft guide frame 4 can be returned to its original state set at the time of shipping. In other words, in the optical pickup apparatus 1, the thickness of the spacer 60 is set such that the state in which the spacer 60 is inserted provides a reference state at the time of shipping.

Similarly, for the second inclination angle adjusting mechanism, a spacer 60 having a predetermined thickness is inserted between the rectangular protruded surface 34a formed in the main frame 3 and defining the screw hole 35 for the second inclination angle adjusting screw 22 and a surface 53 on the auxiliary shaft guide frame 4 opposing to the rectangular protruded surface 34a where the screw bushing hole 54 is formed. In this state, the second inclination angle adjusting screw 22 is fastened. As a result, the inclination angle of the auxiliary shaft guide frame 5 can be returned to its original state set at the time of shipping. In other words, the thickness of the spacer is set such that the state in which the spacer 60 is inserted provides a reference state at the time of shipping. It should be noted that the thickness of the spacer 60 for the second inclination angle adjusting mechanism may be the same as or different from the thickness of the spacer 60 for the first inclination angle adjusting mechanism.

In this manner, the insertion of the spacers 60 always reproduces the initial inclination angles of the main shaft guide frame 4 and the auxiliary shaft guide frame 5 with respect to the main frame 3 about the axes L1 and L2 of the main frame 3 initially set. These initial inclination angle states are used as reference positions for adjustment of the inclination angles in the optical pickup apparatus 1. As a result, when the optical pickup apparatus of the present invention is mounted on an optical disc player apparatus or the like, adjustments to increase or decrease the inclination angle of the objective lens can be readily made. Furthermore, when the performance of the optical head section may deteriorate for one reason or another after the inclination angle of the optical head section is adjusted, the initial inclination angle set at the time of shipping can be readily obtained by the insertion of the spacers, and the performance of the optical head section can be evaluated under the same conditions at the time of shipping. As a result, defects can be readily determined and repaired.

Some of the effects achieved by the present invention will be described below.

An optical pickup apparatus having an objective lens in accordance with the present invention has a first inclination angle adjusting mechanism for tilting the objective lens about a first axis that passes through a center of the auxiliary shaft guide groove and extends in a direction perpendicular to the direction in which the objective lens shifts in the radial direction of the optical disc, and a second inclination angle adjusting mechanism for tilting the objective lens about a second axis that extends in a radial direction of the optical disc and concurs with a central axis of the main shaft. The inclination angle adjusting mechanisms adjust the inclination angles of the main shaft guide frame and the auxiliary shaft guide frame that are rotatably mounted on the main frame about the first and second bearing axes to thereby adjust the inclination of the objective lens. Such adjustments are done by turning the first and the second inclination angle adjusting screws. Furthermore, both of the inclination angle adjusting mechanisms have similar structures, and adjust the inclination angles about the first and second bearing axes by turning the inclination angle adjusting screws.

In a typical optical pickup apparatus of the conventional structure, a radial ball bearing is mounted on an eccentric pin for inclination angle adjustment, and the radial ball bearing is merely placed on an auxiliary shaft. As a result, the optical pickup apparatus of the conventional structure cannot be vertically placed in a manner that a disc is vertically placed. In contrast, the optical pickup apparatus of the present invention can be vertically placed and mounted on a player apparatus because of the structure described above.

Also, in the optical pickup apparatus having the inclination angle adjusting mechanisms with the structure described above in accordance with the present invention, the first and second spacers are inserted between the main frame and each of the main shaft guide frame and the auxiliary shaft guide frame, whereby the main shaft guide frame and the auxiliary shaft guide frame can be maintained at reference inclination angles with respect to the main frame. Therefore, the main shaft guide frame and the auxiliary shaft guide frame are set at initial inclination angles about the axes of the main frame when they are mounted on the main frame, and thereafter the initial inclination angles can be readily reproduced by the insertion of the spacers. Accordingly, when the performance of the optical head section may deteriorate for one reason or another after the inclination angle of the optical head section is adjusted, the initial inclination angle set at the time of shipping can be readily reproduced by the insertion of the spacers, and the performance of the optical head section can be evaluated under the same conditions at the time of shipping. As a result, determination and repair of defects become very easy.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical pickup apparatus having an objective lens, a lens holder that mounts the objective lens, a main frame holding the lens holder, and an inclination angle adjusting mechanism for adjusting an angle of inclination of the objective lens, the apparatus comprising:

a main shaft guide frame mounted on one side of the main frame, the main shaft guide frame defining at least one main shaft guide aperture;

a main shaft for guiding the objective lens in a radial direction of an optical disc, the main shaft passing through the at least one main shaft guide aperture;

an auxiliary shaft guide frame mounted on another side of the main frame, the auxiliary shaft guide frame having an auxiliary shaft guide groove; and an auxiliary shaft passing through the auxiliary shaft guide groove and adapted to allow the objective lens to slidably move thereon in parallel with the main shaft;

the inclination angle adjusting mechanism having a first inclination angle adjusting mechanism for tilting the objective lens about a first axis that passes through a center of the auxiliary shaft guide groove and extends in a direction perpendicular to the direction in which the objective lens shifts in the radial direction of the optical disc, and a second inclination angle adjusting mechanism for tilting the objective lens about a second axis that concurs with a central axis of the main shaft;

the first inclination angle adjusting mechanism having a first bearing shaft for rotatably supporting the main shaft guide frame about the first axis with respect to the main frame, and a first inclination angle adjusting screw that fixes the main shaft guide frame about the first bearing shaft at a predetermined inclined position; and the second inclination angle adjusting mechanism has a second bearing shaft for rotatably supporting the auxiliary shaft guide frame with respect to the main frame about a third axis extending in parallel with the second axis, and a second inclination angle adjusting screw that fixes the auxiliary shaft guide frame about the second bearing shaft at a predetermined inclined position.

2. An optical pickup apparatus according to claim 1, wherein the main shaft guide aperture includes two apertures provided in the main shaft guide frame at two locations in a direction along the main shaft, and the auxiliary shaft guide groove is provided in the auxiliary shaft guide frame at one location, the first inclination angle adjusting mechanism is located between the two main shaft guide apertures, and the second inclination angle adjusting mechanism is located between the main shaft and the auxiliary shaft, and is disposed along a direction perpendicular to a direction in which the second bearing shaft and the second inclination angle adjusting screw provided on the auxiliary shaft guide frame move in a direction in which the objective lens moves in the radial direction of the optical disc.

3. An optical pickup apparatus according to claim 2, wherein spring washers are disposed between heads of the first and second inclination angle adjusting screws and the main shaft guide frame and the auxiliary shaft guide frame, respectively, the heads of the first and second inclination angle adjusting screws being normally pushed by leaf springs toward the spring washers.

4. An optical pickup apparatus according to claim 3, wherein the first inclination angle adjusting screw, the spring washer and the leaf spring of the first inclination angle adjusting mechanism are composed of common parts for the second inclination angle adjusting screw, the spring washer and the leaf spring of the second inclination angle adjusting mechanism.

5. An optical pickup apparatus according to claim 1, wherein the auxiliary shaft guide frame has a pair of groove side surfaces that form the auxiliary shaft guide groove and are in contact with the auxiliary shaft, the groove side surfaces having a convex circular surface that protrudes from the groove side surfaces as viewed in the direction of the first axis, such that the angle adjustment is performed while the convex circular surface is in contact with the auxiliary shaft.

6. An optical pickup apparatus according to claim 5, wherein the main shaft guide aperture includes two apertures provided in the main shaft guide frame at two locations in a direction along the main shaft, and the auxiliary shaft guide groove is provided in the auxiliary shaft guide frame at one location, the first inclination angle adjusting mechanism is located between the two main shaft guide apertures, and the second inclination angle adjusting mechanism is located between the main shaft and the auxiliary shaft, and is disposed along a direction perpendicular to a direction in which the second bearing shaft and the second inclination angle adjusting screw provided on the auxiliary shaft guide frame move in a direction in which the objective lens moves in the radial direction of the optical disc.

7. An optical pickup apparatus according to claim 6, wherein the second inclination angle adjusting mechanism is located between the main shaft and the auxiliary shaft, the second inclination angle adjusting screw is disposed between the auxiliary shaft guide groove and the second bearing shaft, and a distance between the center of the auxiliary shaft guide groove and the center of the second bearing shaft being a half or less than a distance between the center of the auxiliary shaft guide groove and the second axis.

8. An optical pickup apparatus according to claim 7, wherein the auxiliary shaft guide frame has a pair of groove side surfaces that form the auxiliary shaft guide groove and are in contact with the auxiliary shaft, the groove side surfaces having a convex circular surface that protrudes from the groove side surfaces as viewed in the direction of the first axis, such that the angle adjustment is performed while the convex circular surface is in contact with the auxiliary shaft.

9. An optical pickup apparatus according to claim 8, wherein the main shaft guide aperture includes two apertures provided in the main shaft guide frame at two locations in a direction along the main shaft, and the auxiliary shaft guide groove is provided in the auxiliary shaft guide frame at one location, the first inclination angle adjusting mechanism is located between the two main shaft guide apertures, and the second inclination angle adjusting mechanism is disposed along a direction perpendicular to a direction in which the second bearing shaft and the second inclination angle adjusting screw provided on the auxiliary shaft guide frame move in a direction in which the objective lens moves in the radial direction of the optical disc.

10. An optical pickup apparatus according to claim 9, wherein a first spacer and a second spacer each having a predetermined thickness are disposed in gaps between the main shaft guide frame and the auxiliary shaft guide frame and the main frame, respectively, to thereby set the main shaft guide frame and the auxiliary shaft guide frame at reference inclination angles with respect to the main frame.

11. An optical pickup apparatus according to claim 10, wherein the first and second spacers are removed to thereby enable adjusting inclined positions of the main shaft guide frame and the auxiliary shaft guide frame with respect to the main frame.

12. An optical pickup apparatus having an objective lens, a lens holder that mounts the objective lens, and a main frame holding the lens holder, the optical pickup apparatus comprising:

a main shaft guide frame mounted on one side of the main frame;

a main shaft mounted on the main shaft guide frame for guiding the objective lens in a first direction;

an auxiliary shaft guide frame mounted on another side of the main frame and having an auxiliary shaft guide groove extending in the first direction;

an auxiliary shaft received in the auxiliary shaft guide groove to allow the objective lens to slidably move in parallel with the main shaft;

a first inclination angle adjusting mechanism for rotatably supporting the main shaft guide frame with respect to the main frame about a first axis extending perpendicular to the first direction, the main shaft defining a second axis perpendicular to the first axis; and a second inclination angle adjusting mechanism for rotatably supporting the auxiliary shaft guide frame with respect to the main frame about a third axis that is located between the main shaft and the auxiliary shaft and extends in parallel with the second axis.

13. An optical pickup apparatus according to claim 12, wherein the main shaft guide frame has two main shaft guide apertures provided at two locations in a direction along the main shaft, the first inclination angle adjusting mechanism is located between the two main shaft guide apertures, and the second inclination angle adjusting mechanism is located between the main shaft and the auxiliary shaft, and is disposed along a direction perpendicular to the first direction in which the objective lens moves in a radial direction of an optical disc.

14. An optical pickup apparatus according to claim 12, wherein the first inclination angle adjusting mechanism has a first bearing shaft for rotatably supporting the main shaft guide frame about the first axis with respect to the main frame, and a first inclination angle adjusting screw that fixes the main shaft guide frame about the first bearing shaft at a predetermined inclined position; and the second inclination angle adjusting mechanism has a second bearing shaft for rotatably supporting the auxiliary shaft guide frame with respect to the main frame about a third axis extending in parallel with the second axis, and a second inclination angle adjusting screw that fixes the auxiliary shaft guide frame about the second bearing shaft at a predetermined inclined position.

15. An optical pickup apparatus according to claim 14, wherein spring washers are disposed between heads of the first and second inclination angle adjusting screws and the main shaft guide frame and the auxiliary shaft guide frame, respectively, the heads of the first and second inclination angle adjusting screws being normally pushed by leaf springs toward the spring washers.

16. An optical pickup apparatus according to claim 15, wherein the first inclination angle adjusting screw, the spring washer and the leaf spring of the first inclination angle adjusting mechanism are composed of common parts for the second inclination angle adjusting screw, the spring washer and the leaf spring of the second inclination angle adjusting mechanism.

17. An optical pickup apparatus according to claim 12, wherein the auxiliary shaft guide groove has a pair of opposing groove side surfaces that come in contact with the auxiliary shaft, each of the groove side surfaces having a convex circular surface that protrudes from the groove side surfaces as viewed in the direction of the first axis.

\* \* \* \* \*